US012080491B2

(12) United States Patent
Chen

(10) Patent No.: US 12,080,491 B2
(45) Date of Patent: Sep. 3, 2024

(54) KEYBOARD AND KEY STRUCTURE THEREOF

(71) Applicant: Acer Incorporated, New Taipei (TW)

(72) Inventor: Hung-Chi Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/071,514

(22) Filed: Nov. 29, 2022

(65) Prior Publication Data

US 2024/0006133 A1 Jan. 4, 2024

(30) Foreign Application Priority Data

Jun. 30, 2022 (TW) ................................. 111124591

(51) Int. Cl.
*H01H 13/20* (2006.01)
*H01H 13/14* (2006.01)
*H01H 13/70* (2006.01)

(52) U.S. Cl.
CPC ............ *H01H 13/20* (2013.01); *H01H 13/14* (2013.01); *H01H 13/70* (2013.01)

(58) Field of Classification Search
CPC ........ H01H 13/20; H01H 13/14; H01H 13/70; H01H 3/125; H01H 13/706; H01H 13/7065
USPC ......................................... 200/341, 344, 345
See application file for complete search history.

(56) References Cited

U.S. PATENT DOCUMENTS 11,056,293 B1 * 7/2021 Chen ...................... H01H 13/84
11,264,185 B2 * 3/2022 Yang ...................... H01H 13/85
11,727,905 B2 * 8/2023 Harms ................. H01H 13/703 200/341
11,742,160 B1 * 8/2023 Chen ...................... H01H 13/14 200/341
2018/0012713 A1 * 1/2018 Taga ..................... G06F 3/0202

FOREIGN PATENT DOCUMENTS

TW I720917 3/2021
TW I725672 4/2021

* cited by examiner

*Primary Examiner* — Lheiren Mae A Caroc
(74) *Attorney, Agent, or Firm* — JCIPRNET

(57) ABSTRACT

A key structure of keyboard including a base, at least one force sensing membrane disposed on the base, a scissors mechanism, a key cap, a bracket sets assembled to the key cap, a first sleeve, a second sleeve, a spring, and a pressing member disposed at a bottom of the second sleeve is provided. A side of the scissors mechanism is movably leaned against the base and located on the force sensing membrane, and another side of the scissors mechanism is pivoted to the bracket sets. A portion of the first sleeve is assembled between the key cap and the bracket sets, and another portion of the first sleeve passes through the bracket sets. The second sleeve is movably socketed in the first sleeve. The spring is leaned against the second sleeve and the key cap. A keyboard is also provided.

10 Claims, 7 Drawing Sheets

KEYBOARD AND KEY STRUCTURE THEREOF

CROSS-REFERENCE TO RELATED APPLICATION

This application claims the priority benefit of Taiwan application serial no. 111124591, filed on Jun. 30, 2022. The entirety of each of the above-mentioned patent applications is hereby incorporated by reference herein and made a part of this specification.

BACKGROUND

Technical Field

The disclosure relates to a key structure, and in particular, to a keyboard and key structure thereof.

Description of Related Art

Generally speaking, most of the key structures of the keyboards only have the functions of on and off. When the key is pressed down, its switch circuit is turned on so that the corresponding command can be input, and when the key is released and rebounds, its switch circuit is turned off to end the command. However, with the popularity of e-sports games, the existing keyboards can no longer meet the needs of e-sports players. For example, some game programs further require that keyboard keys can simultaneously reflect speed, acceleration, force, direction, and continuous control of the action process. Therefore, related keyboards with linear keys are also produced, which allow game programs to determine the delay time or speed of output commands by pressing the keys, so as to achieve the above-mentioned control effect.

However, during the use of the existing force-sensitive keys, the rubber dome can be deformed instantaneously and contact the force sensing membrane due to the deformation characteristics of the rubber dome. That is, the user presses on the key cap until the pressure value matches the collapse pressure of the rubber dome. In other words, the user must continue to press the above-mentioned contact, that is, after touching the pressure-sensitive area of the pressure-sensitive film, so that the key can start to perform the above-mentioned control effect. and the above-mentioned control effect cannot be produced. That is, before touching the force-sensitive area, there is an idle stroke, and the above-mentioned control effect cannot be produced.

On the other hand, after the rubber dome has been deformed and contacted the pressure-sensitive area of the pressure-sensitive film as described above, it does not have enough pressing stroke to produce the above-mentioned control effect. Therefore, it is not possible to provide the user with a sufficient sense of linear operation. Conversely, if there is still enough pressing stroke after the contact, this is equivalent to greatly increasing the pressing stroke of the key, which is not conducive to the thinning of the device.

Therefore, how to take into account the pressing stroke of the keys structure and the required control effect is actually a problem that the relevant technical personnel need to think about and solve.

SUMMARY

The present invention provides a keyboard and a key structure thereof, which have a thin and light structure and provide a better linear pressing feel.

A key structure of keyboard including a base, at least one force sensing membrane, a scissors mechanism, a key cap, a bracket sets, a first sleeve, a second sleeve, a spring, and a pressing member is provided. The force sensing membrane is disposed on the base. A side of the scissors mechanism is movably leaned against the base and located on the force sensing membrane. The bracket sets are assembled to the key cap. Another side of the scissors mechanism is pivoted to the bracket sets. A portion of the first sleeve is assembled between the key cap and the bracket sets, and another portion of the first sleeve passes through the bracket sets. The second sleeve is movably socketed in the first sleeve. The spring is leaned against the second sleeve and the key cap. The pressing member is disposed at a bottom of the second sleeve. When the key structure is not pressed, the pressing member contacts the force sensing membrane. During the process of pressing the key structure, the first sleeve moves toward the force sensing membrane continuously along with the key cap and the bracket sets, compresses the spring, and deforms the force sensing membrane through the spring, the second sleeve, and the pressing member until the second sleeve abuts against the key cap.

The keyboard of the present invention includes a base, a first force sensing membrane, a second force sensing membrane, at least one first key and a plurality of second keys. The first force sensing membrane is disposed on the base. The second force sensing membrane is disposed between the base and the first force sensing membrane. The first key is disposed on the first force sensing membrane. The second keys are disposed on the first force sensing membrane. The orthographic projection of the first key on the first force sensing membrane and the orthographic projection of the second force sensing membrane on the first force sensing membrane correspond to each other and are consistent with each other.

Based on the above, through the sliding sleeve structure of the key structure and the corresponding relationship between the elastic member abutting the sleeve and the key cap, the key structure is pressed to produce a linear stroke change. That is, a key structure with a "linear axis" is formed to distinguish it from the current key structure of a "standard axis", thereby providing additional key control effects and operating feel.

Furthermore, the key structure also has a pressing member disposed at the bottom of the sleeve, which contacts the force sensing membrane when the key structure is not pressed. Therefore, once the key cap is pressed and starts to move, the force sensing membrane can be deformed by the pressing member immediately, so that the force sensing membrane can immediately reflect the current pressed state of the key cap. In other words, the key structure of the present invention can effectively avoid the idle stroke caused by the aforementioned deformation mode. It is different from the current standard shaft, which requires the user to continuously apply force to a certain value, and then the contact point is actuated due to the instantaneous deformation of the rubber dome. Accordingly, as for the overall structure of the keyboard, the designer can change the required keys to the above-mentioned key structure according to the requirements, in which the single-piece force sensing membrane or the double-piece force sensing membrane can be used to effectively achieve the trigger function of the keys. At the same time, it can effectively reduce the overall thickness (height) of the key structure, and have a thin and light appearance.

DESCRIPTION OF THE EMBODIMENTS

Figure 1:
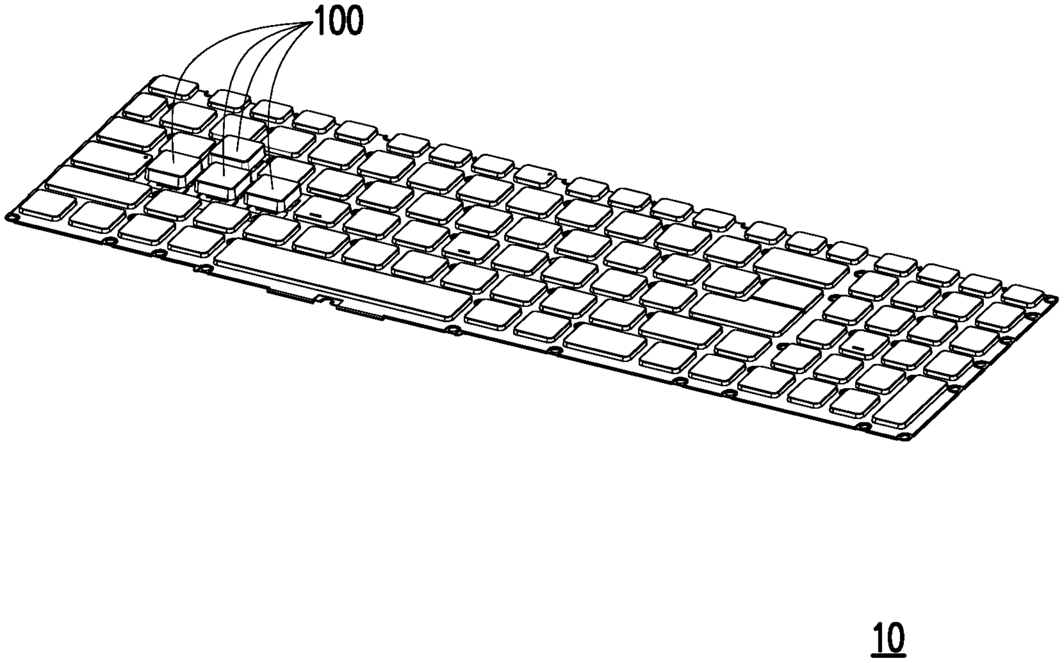
FIG. 1 is a schematic diagram of a keyboard according to an embodiment of the present invention.
Figure 2:
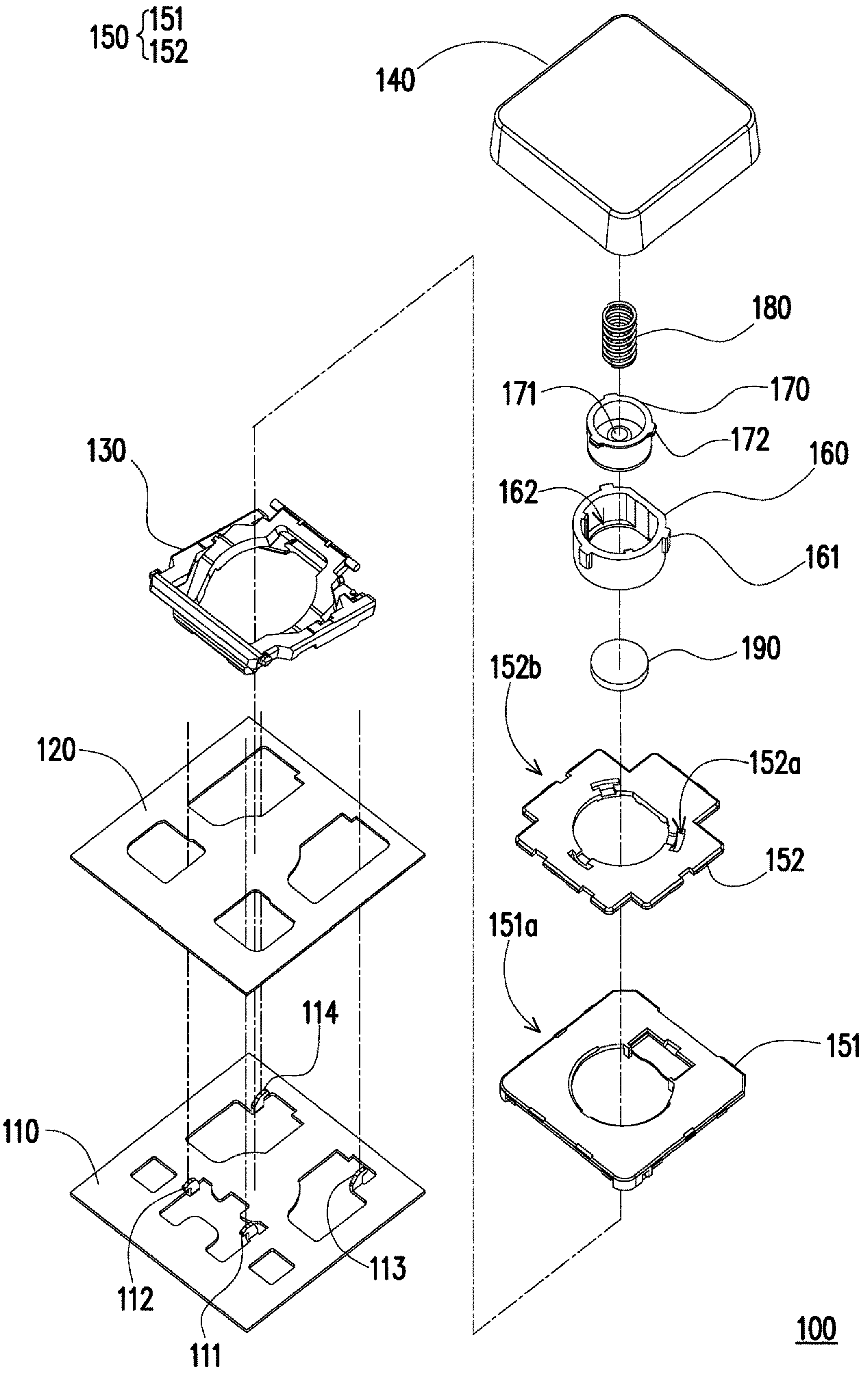
FIG. 2 is an exploded view of one of the key structures of the keyboard of FIG. 1.
Figure 3:
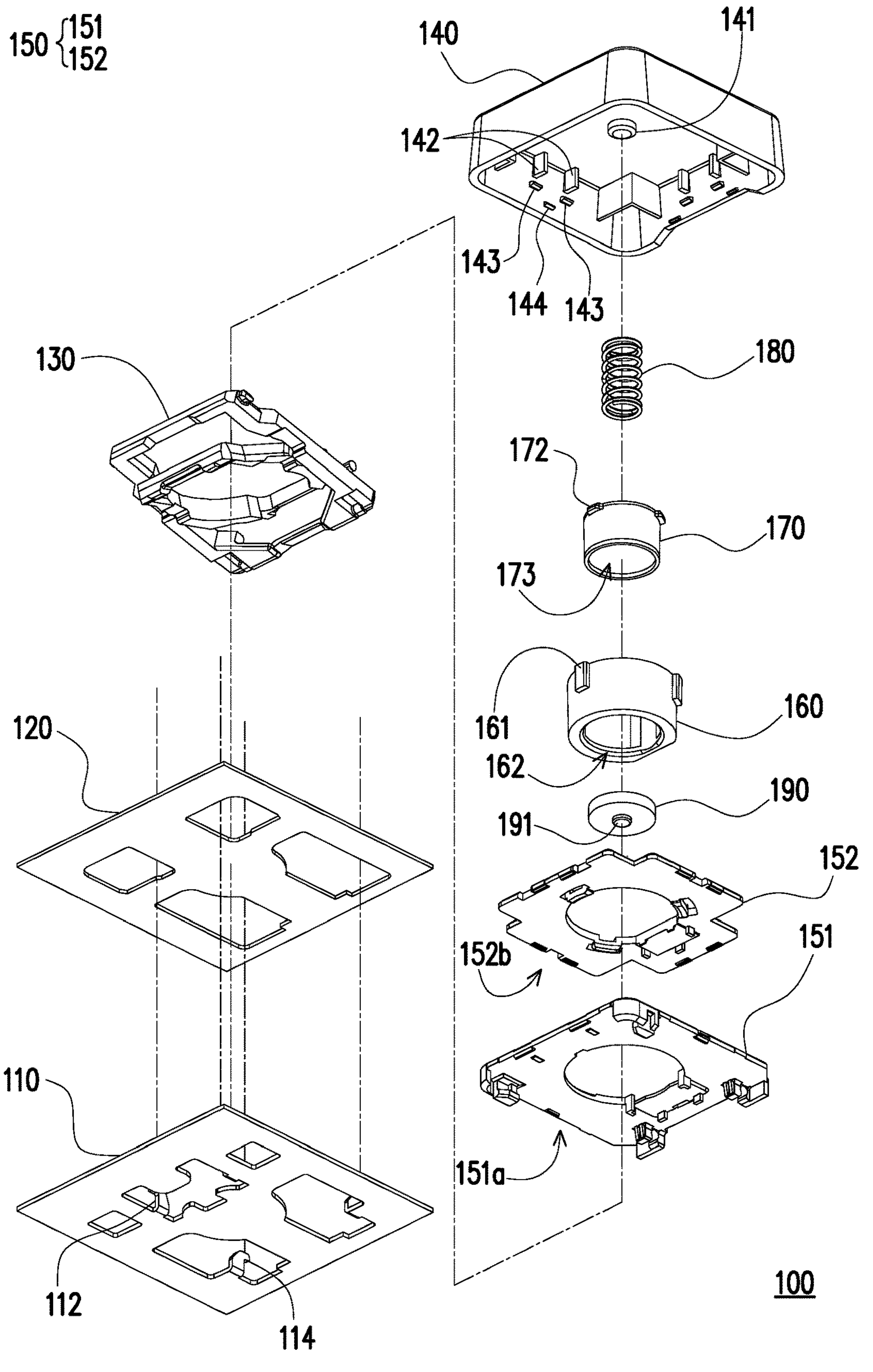
FIG. 3 is an exploded view of the key structure of FIG. 2 from another perspective. P

FIG. 1 is a schematic diagram of a keyboard according to an embodiment of the present invention. FIG. 2 is an exploded view of one of the key structures of the keyboard of FIG. 1. FIG. 3 is an exploded view of the key structure of FIG. 2 from another perspective. Referring to FIGS. 1 to 3 at the same time, in the embodiment, the keyboard 10 is, for example, an independent keyboard applied to a personal computer (PC), or a keyboard configured in a notebook computer. The keyboard 10 includes at least one key 100 to provide the controls required for the aforementioned eSports games. Here, four keys 100 are taken as an example. Although the figures are not clearly shown, the four keys 100 shown are equivalent to the four keys W, A, S, and D well known in e-sports games.

In the embodiment, the structure of the key 100 includes a base 110, a force sensing membrane 120, a scissors mechanism 130, a key cap 140, a bracket sets 150, a first sleeve 160, a second sleeve 170, a spring 180, and a pressing member 190. The force sensing membrane 120 is disposed on the base 110. A side of the scissors mechanism 130 is movably leaned against the base 110 and located on the force sensing membrane 120. The bracket sets 150 assembled to the key cap 140, and another side of the scissors mechanism 130 is pivoted to the bracket sets 150. A portion of the first sleeve 160 is assembled between the key cap 140 and the bracket sets 150, and another portion of the first sleeve 160 passes through the bracket sets 150. The second sleeve 170 is movably socketed in the first sleeve 160. The spring 180 is leaned against the second sleeve 170 and the key cap 140. The pressing member 190 is disposed on the bottom of the second sleeve 170. The force sensing membrane 120 is, for example, a resistive force sensing membrane.

Further, referring to FIG. 2 and FIG. 3 at the same time, the base 110 of the embodiment has hooks 111, 112, 113, and 114, which pass through the opening of the force sensing membrane 120, so that one side of the scissors mechanism 130 is pivoted and fastened to the hooks 111, 112, 113, and 114. The bracket sets 150 includes a first bracket 151 and a second bracket 152, as shown in FIG. 3. There are a plurality of snap structures 142, 143 and 144 on the inner surface of the key cap 140, so that the second bracket 152 can be snapped between the snap structures 142 and 143 with its four side edges 152*b* (only one side edge 152*b* is shown as an example), and the first bracket 151 can be snapped between the snap structures 143 and 144 with its four side edges 151*a* (only one side edge 151*a* is shown as an example).

Moreover, the second bracket 152 has an opening and a plurality of grooves 152*a* on the periphery of the opening, and the first sleeve 160 has a plurality of protruding ribs 161 on the outer wall thereof, so as to be embedded in the grooves 152*a*. Therefore, part of the first sleeve 160 is abutted between the inner top surface of the key cap 140 and the second bracket 152. Accordingly, the key cap 140, the bracket sets 150 and the first sleeve 160 are fixed to each other due to the above, and can move synchronously when pressed.

In addition, the inner wall of the first sleeve 160 has a side skirt structure 162, and the outer wall of the second sleeve 170 has protruding ribs 172. Therefore, when the second sleeve 170 is slidably nested inside the first sleeve 160, the side skirt structure 162 can stop the protruding ribs 172, so that the second sleeve 170 can be prevented from falling off from the first sleeve 160.

The opposite ends of the spring 180 are respectively sleeved on the convex portion 141 on the inner top surface of the key cap 140 and the convex portion 171 on the inner bottom surface of the second sleeve 170. Here, the spring 180 is a linear spring, which is used to provide linear deformation when the key 100 is pressed, so as to provide corresponding functions. For example, due to the linear deformation characteristics of the spring 180, the key 100 can provide control effects such as speed, action strength, direction, and continuity of the action process as the key cap 140 is pressed to different degrees. Therefore, the key 100 is considered a "linear axis". On the contrary, the remaining keys of the key 100 not marked in FIG. 1 maintain the design feature of the rubber dome of the prior art. It is considered a "standard axis" because it produces nonlinear deformations, that is, it only provides simple on/off commands.

Figure 4A:
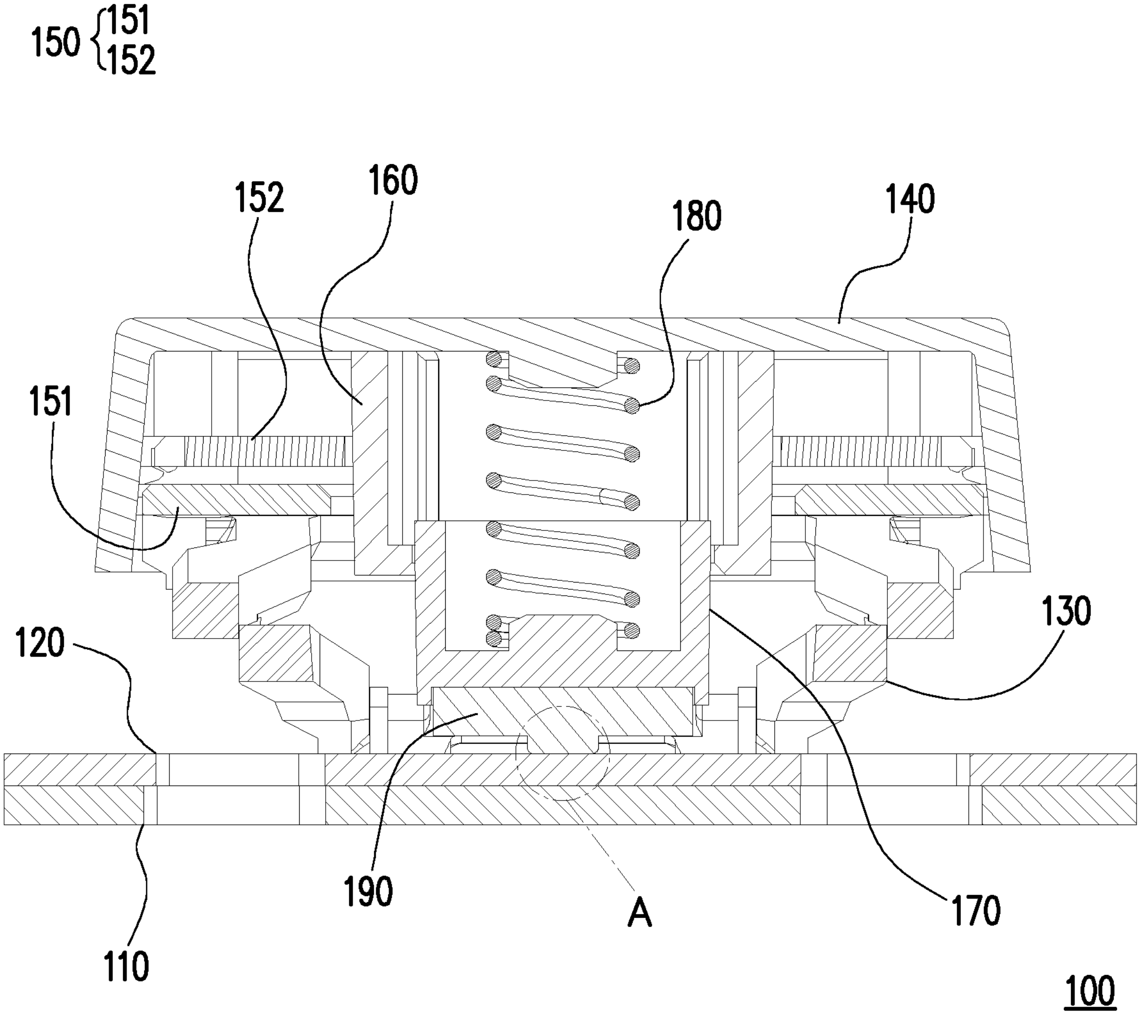
FIG. 4A is a cross-sectional view of the key structure of FIG. 2 in a non-pressing state.
Figure 4B:
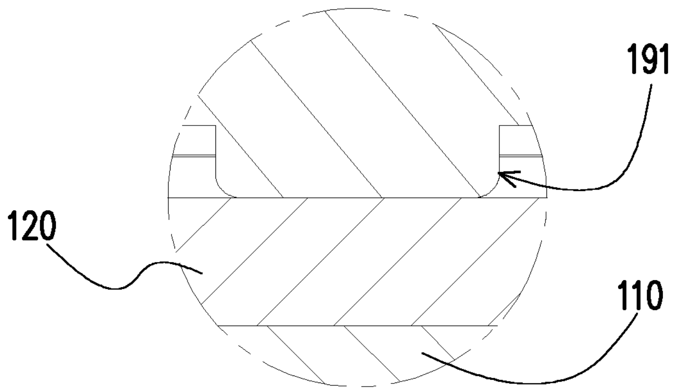
FIG. 4B is an enlarged view of portion A in FIG. 4A.
Figure 5A:
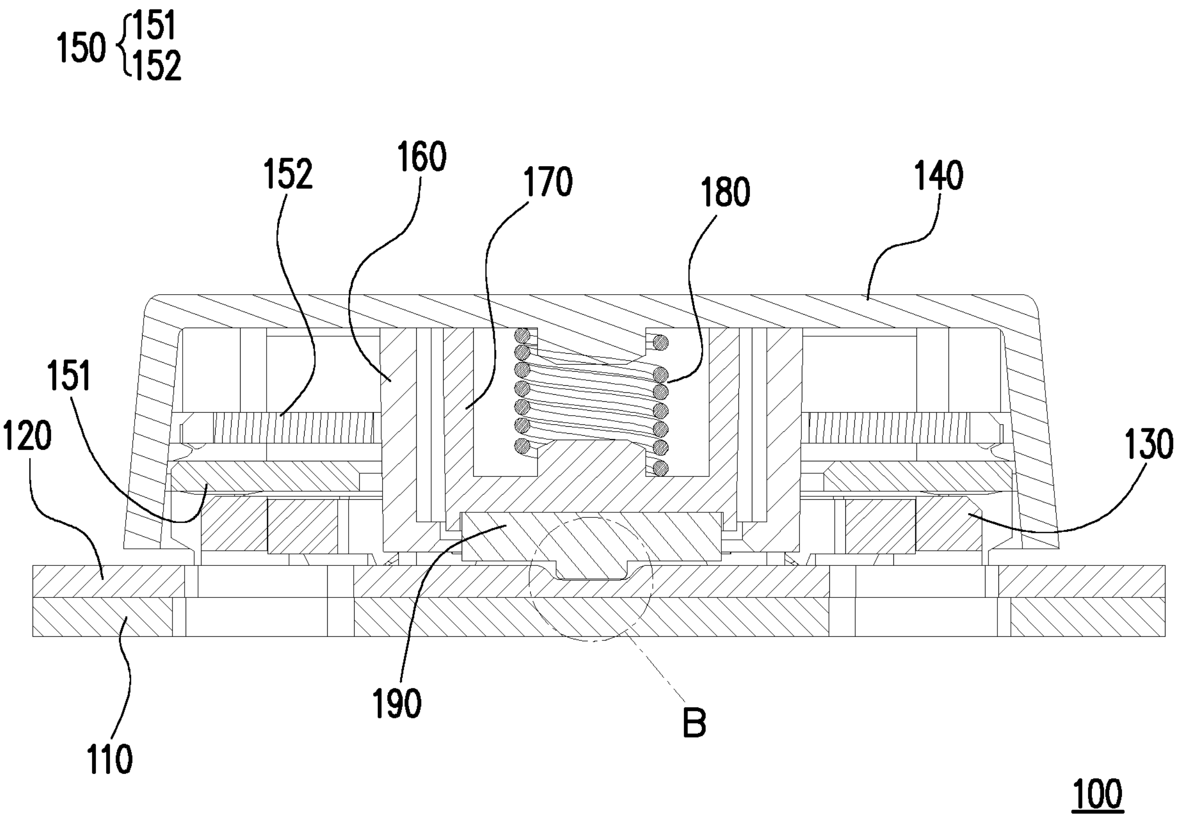
FIG. 5A is a cross-sectional view of the key structure of FIG. 2 in a pressing state.
Figure 5B:
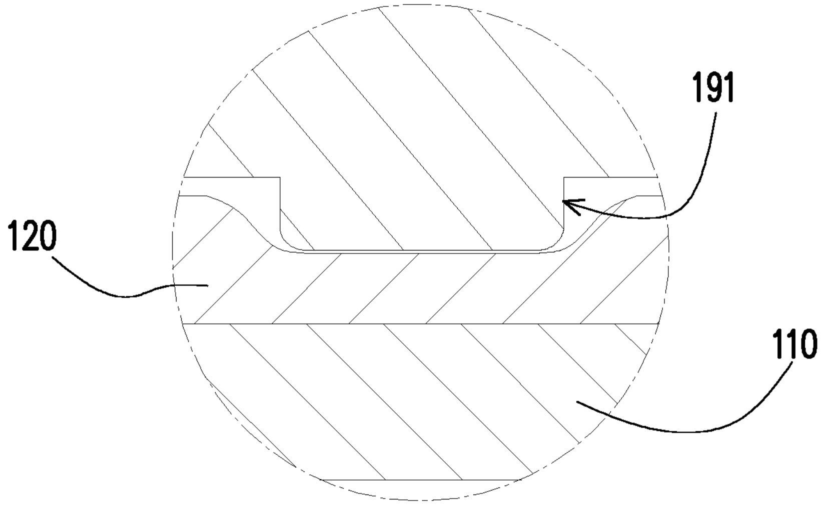
FIG. 5B is an enlarged view of portion B in FIG. 5A.

FIG. 4A is a cross-sectional view of the key structure of FIG. 2 in a non-pressing state; FIG. 4B is an enlarged view of portion A in FIG. 4A; FIG. 5A is a cross-sectional view of the key structure of FIG. 2 in a pressing state; and FIG. 5B is an enlarged view of portion B in FIG. 5A. The former two drawings are states in which the key 100 is not pressed, and the latter two drawings are states in which the key 100 is pressed and bottomed. Therefore, FIGS. 4A, 4B, 5A, and 5B can be regarded as the starting point and the end point of the pressing stroke of the key 100 respectively. Referring to FIG. 4A, 4B, 5A, and FIG. 5B and comparing FIG. 3 at the same time, the second sleeve 170 of the embodiment has an accommodating groove 173 at the bottom thereof, and the pressing member 190 is disposed in the accommodating groove 173 to move with the second sleeve 170. More importantly, the thickness of the force sensing membrane 120 in the embodiment is 0.25 mm, and when the pressure is not applied as shown in FIG. 4, the pressing protrusion 191 of the pressing member 190 contacts the force sensing membrane 120. During the process of pressing the key 100, the first sleeve 160 moves toward the force sensing membrane 120 continuously along with the key cap 140 and the bracket sets 150, compresses the spring 180, and deforms the force sensing membrane 120 through the spring 180, the second sleeve 170, and the pressing member 190 until the second sleeve 170 abuts against the inner top surface of the key cap 140. In other words, due to the pressing member 190 and its corresponding relationship with the force sensing membrane 120, the initial pressing of the key 100 can smoothly reflect the linear deformation characteristics of the spring 180. Here, the pressing member 190 is, for example, made of rubber material, or made of rubber and plastic double-material injection molding. The material of the pressing protrusion 191 is rubber, which not only makes the sliding of the second sleeve 170 smooth due to the plastic, but also increases the uniformity of the force sensing membrane 120 when the force is applied. Therefore, the tolerance of the pressing stroke caused by the tilt of the key cap 140 due to uneven force can be absorbed. Here, the user can select the pressing member 190 (or pressing protrusion 191) with corresponding hardness or corresponding shape according to the sensing characteristics of the force sensing membrane 120 to ensure that the force sensing membrane 120 can faithfully reflect the pressed state of the key 100.

Figure 6:
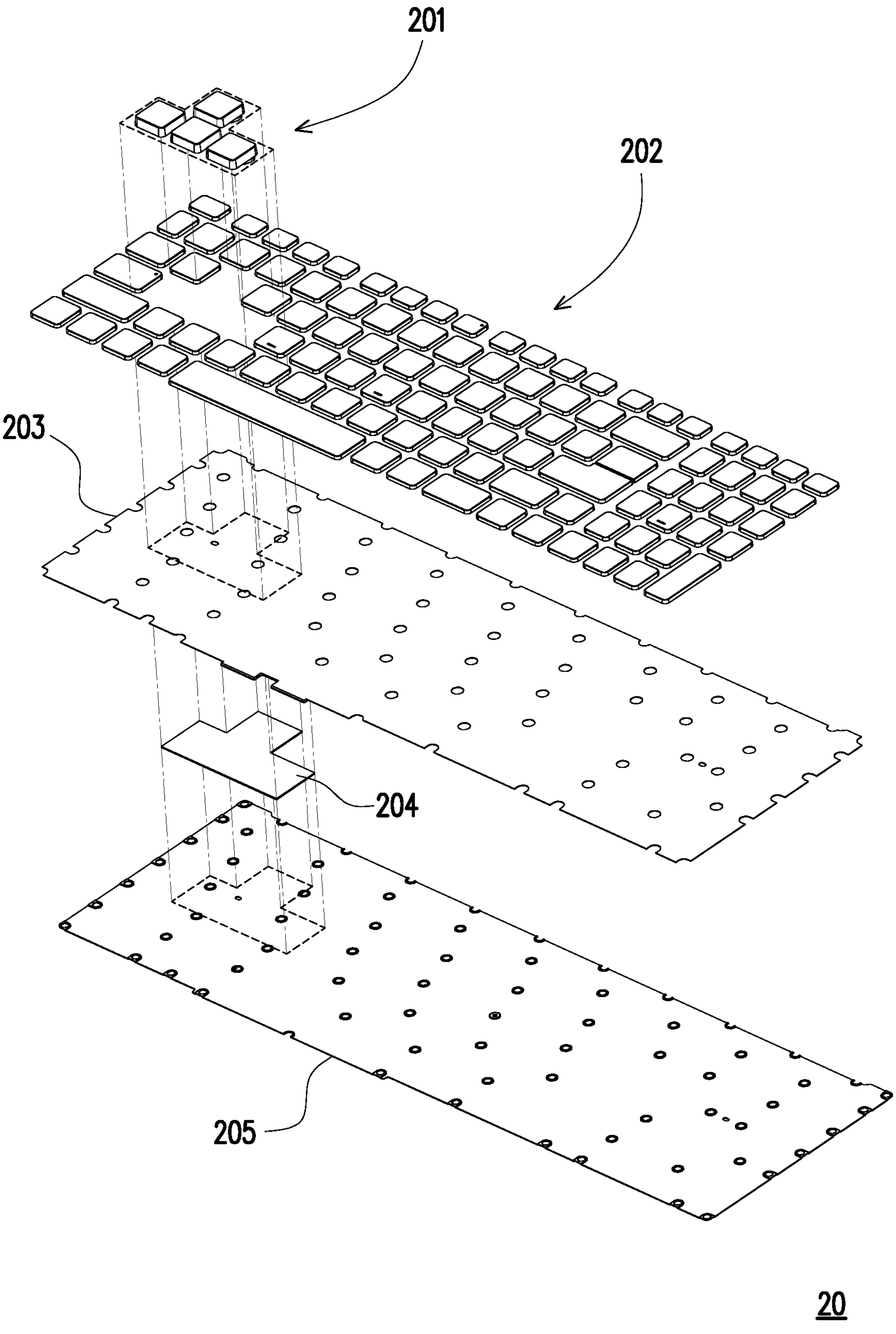
FIG. 6 is an exploded view of a part of the keyboard of another embodiment of the present invention.

FIG. 6 is an exploded view of a part of the keyboard of another embodiment of the present invention. Referring to FIG. 6, in the embodiment, the keyboard 20 includes a base 205, a first force sensing membrane 203, a second force sensing membrane 204 and keys 201, 202. Here, like the aforementioned embodiments, the key 201 is a key for providing a linear axis, and the key 202 is an existing standard key. Unlike the aforementioned key 100 that only has a single force sensing membrane 120, this embodiment actually replaces the key 201 that needs to provide a "linear axis" with the aforementioned structure. However, during the replacement process, it is limited by the existing first force sensing membrane 203, so a second force sensing membrane 204 is further provided to perform pressure sensing on the key 201 with a "linear axis" structure. Wherein the orthographic projection of the key 201 on the first force sensing membrane 203 and the orthographic projection of the second force sensing membrane 204 on the first force sensing membrane 203 correspond to each other and are consistent with each other. Furthermore, the key 201 is not limited to the position shown in the figure, any key of the keyboard 20 can be replaced with a "linear axis" key 201 and a corresponding second force sensing membrane 204 is provided. Besides, the key 201 is different from the previous embodiment except that the key 201 is equipped with dual force sensing membranes, and other components (such as, the base 110, the scissors mechanism 130, the key cap 140, the bracket sets 150, the first sleeve 160, the second sleeve 170, the spring 180, and the pressing member 190) are the same as the previous embodiment. Therefore, FIG. 2 and FIG. 3 can be used as a reference.

In other words, the second force sensing membrane 204 adopted in the embodiment can therefore be applied to the keyboard in the prior art. That is to say, the corresponding second force sensing membrane 204 is provided for the key 201 replaced with a "linear axis", so the convenience, flexibility and application range of the application can be improved.

It should also be noted that, FIG. 6 only shows the components relevant to the application, and the other not shown can be known with reference to the prior art, so repeat no more details herein.

Figure 7:
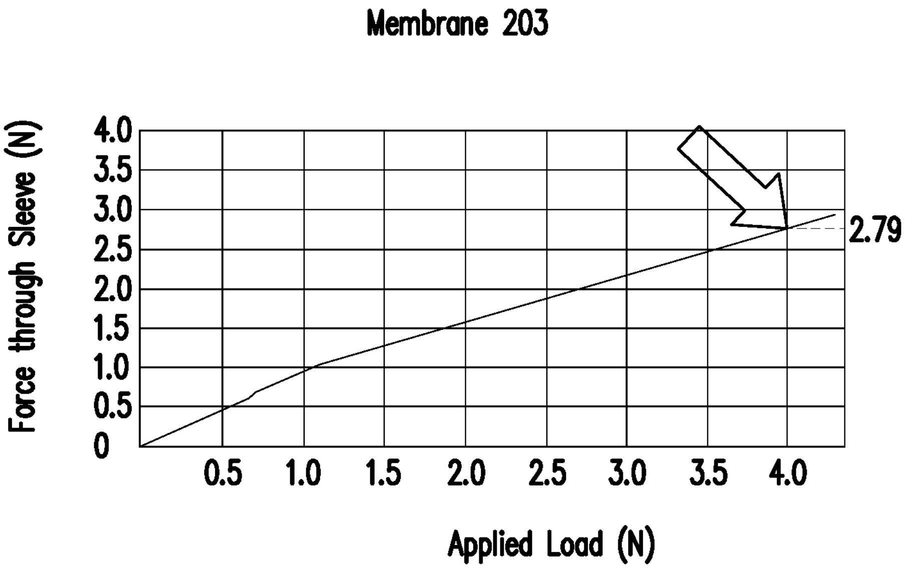
FIG. 7 and FIG. 8 are force detection curves of the keyboard of FIG. 6.
Figure 8:
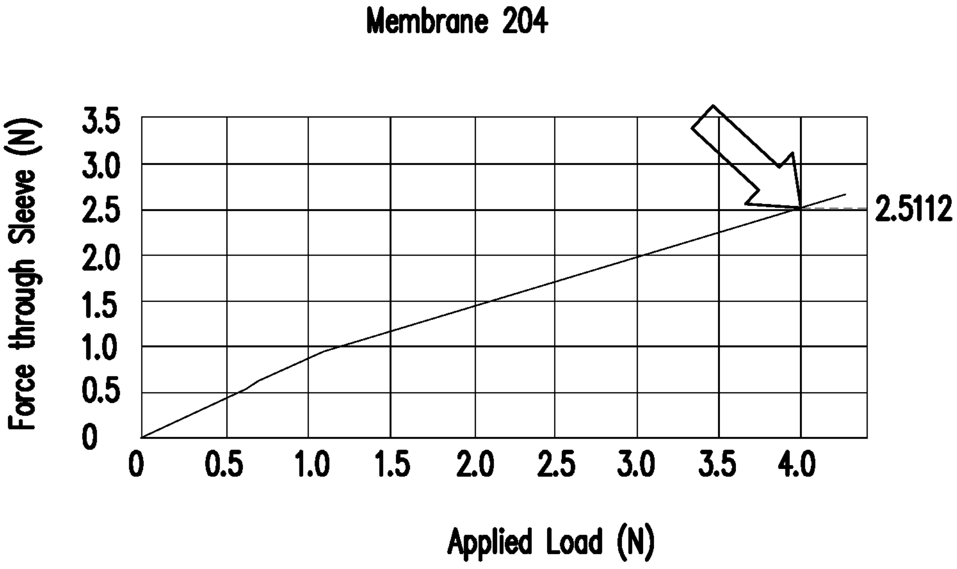

FIG. 7 and FIG. 8 are force detection curves of the keyboard of FIG. 6. Referring to FIG. 7 and FIG. 8 at the same time, in the embodiment, force detection is performed on the first force sensing membrane 203 and the second force sensing membrane 204 shown in FIG. 6 to confirm that the structure shown in FIG. 6 can operate smoothly. As shown in FIG. 7, it is the force detection of the first force sensing membrane 203. Taking the arrow shown in FIG. 7 as an example, when the user provides an applied load of 4 Newtons(N) to the key 201, the force through sleeve sensed by the first force sensing membrane 203 is 2.79 N. It can be further known from FIG. 8 that the force sensed by the second force sensing membrane 204 is 2.5112 N. In other words, the force sensed by the first force sensing membrane 203 is 69.75% of the applied force, and the force sensed by the second force sensing membrane 204 is 62.78% of the applied force. In short, even if the first force sensing membrane 203 and the second force sensing membrane 204 are stacked on each other as shown in FIG. 6, the second force sensing membrane 204 can still sense more than 60% of the force exerted by the user. Accordingly, it can be proved that the structure shown in FIG. 6 can still operate smoothly.

To sum up, in the above-described embodiments of the present invention, through the sliding sleeve structure of the key structure and the corresponding relationship between the elastic member abutting the sleeve and the key cap, the key structure is pressed to produce a linear stroke change. That is, a key structure with a "linear axis" is formed to distinguish it from the current key structure of a "standard axis", thereby providing additional key control effects and operating feel.

Furthermore, the key structure also has a pressing member disposed at the bottom of the sleeve, which contacts the force sensing membrane when the key structure is not pressed. Therefore, once the key cap is pressed and starts to move, the force sensing membrane can be deformed by the pressing member immediately, so that the force sensing membrane can immediately reflect the current pressed state of the key cap. In other words, the key structure of the present invention can effectively avoid the idle stroke caused by the aforementioned deformation mode. It is different from the current standard shaft, which requires the user to continuously apply force to a certain value, and then the contact point is actuated due to the instantaneous deformation of the rubber dome.

On the other hand, the force sensing membrane adopted in the key structure can be further applied to the key structure of the existing keyboard device. That is, the first force sensing membrane and the second force sensing membrane adopted in the aforementioned keyboard allow designers or even users to change the key structure according to their needs or preferences. In other words, any key of the prior art keyboard can be smoothly replaced with the key structure with the feature of "linear axis" as mentioned in the foregoing embodiment. As for the overall structure of the keyboard, the designer can change the required keys to the above-mentioned key structure according to the requirements, in which the single-piece force sensing membrane or the double-piece force sensing membrane can be used to effectively achieve the trigger function of the keys. At the same time, it can effectively reduce the overall thickness (height) of the key structure, and have a thin and light appearance.

What is claimed is:

1. A key structure of a keyboard, comprising:
- a base;
- at least one force sensing membrane, disposed on the base;
- a scissors mechanism, a side of the scissors mechanism is movably leaned against the base and located on the at least one force sensing membrane;
- a key cap;
- a bracket set, assembled to the key cap, another side of the scissors mechanism is pivoted to the bracket set;
- a first sleeve, a portion of the first sleeve is assembled between the key cap and the bracket set, and another portion of the first sleeve passes through the bracket set;
- a second sleeve, movably socketed in the first sleeve;
- a spring, leaned against the second sleeve and the key cap; and
- a pressing member, disposed at a bottom of the second sleeve, wherein when the key structure is not pressed, the pressing member contacts the force sensing membrane, and the first sleeve moves toward the force sensing membrane continuously along with the key cap and the bracket set during a process of pressing the key structure, the spring is compressed and the force sensing membrane is deformed through the spring, the second sleeve, and the pressing member until the second sleeve abuts against the key cap.

2. The key structure of the keyboard according to claim 1, wherein the bracket set comprises a first bracket and a second bracket, respectively clamped on an inside of the key cap, a part of the first sleeve is clamped between the key cap and the first bracket, and another part of the first sleeve passes through the first bracket and the second bracket.

3. The key structure of the keyboard according to claim 2, wherein the second bracket has a plurality of grooves, the first sleeve has a plurality of protruding ribs located on an outer wall of the first sleeve, and the protruding ribs are correspondingly embedded in the grooves.

4. The key structure of the keyboard according to claim 2, wherein the first bracket and the second bracket are respectively clamped on an inner surface of the key cap with a plurality of side edges.

5. The key structure of the keyboard according to claim 1, wherein an outer wall of the second sleeve has a plurality of protruding ribs, and an inner wall of the first sleeve has a side skirt structure, and the side skirt structure is located on a moving path of the protruding ribs, so that the first sleeve stops the second sleeve.

6. The key structure of the keyboard according to claim 1, wherein the spring is a linear spring.

7. The key structure of the keyboard according to claim 1, wherein the force sensing membrane is a resistive force sensing membrane.

8. The key structure of the keyboard according to claim 1, wherein a material of the pressing member is rubber.

9. The key structure of the keyboard according to claim 1, wherein a material of the pressing member is made of plastic and rubber by double-material injection molding.

10. A keyboard, comprising:

a base;

a first force sensing membrane, disposed on the base;

a second force sensing membrane, disposed between the base and the first force sensing membrane;

at least one first key, disposed on the first force sensing membrane; and a plurality of second keys, disposed on the first force sensing membrane, wherein an orthographic projection of the at least one first key on the first force sensing membrane and an orthographic projection of the second force sensing membrane on the first force sensing membrane correspond to each other and are consistent with each other, wherein when the at least one first key is pressed, the first force sensing membrane and the second force sensing membrane generate sensing forces respectively, wherein the key structure of the at least one first key further comprises:

a scissors mechanism, a side of the scissors mechanism is movably leaned against the base;

a key cap;

a bracket set, assembled to the key cap, another side of the scissors mechanism is pivoted to the bracket set;

a first sleeve, a portion of the first sleeve is assembled between the key cap and the bracket set, and another portion of the first sleeve passes through the bracket set;

a second sleeve, movably socketed in the first sleeve;

a spring, leaned against the second sleeve and the key cap; and a pressing member, disposed at a bottom of the second sleeve, wherein when the key structure is not pressed, the pressing member contacts the first force sensing membrane, wherein the first sleeve moves toward the first force sensing membrane and the second force sensing membrane continuously along with the key cap and the bracket set during a process of pressing the key structure, the spring is compressed and the first force sensing membrane and the second force sensing membrane are deformed through the spring, the second sleeve, and the pressing member until the second sleeve abuts against the key cap.

* * * * *